United States Patent
Ohta

(10) Patent No.: US 8,684,535 B2
(45) Date of Patent: Apr. 1, 2014

(54) COOLING UNIT INCLUDING BASE PLATES EACH HAVING A RADIATING FINS THAT HAS AN EXTENDING PORTION TO EXTEND OVER AN ADJACENT BASE PLATE, AND PROJECTOR

(75) Inventor: Masanori Ohta, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 68 days.

(21) Appl. No.: 13/427,065

(22) Filed: Mar. 22, 2012

(65) Prior Publication Data

US 2012/0242963 A1    Sep. 27, 2012

(30) Foreign Application Priority Data

Mar. 23, 2011  (JP) ................................. 2011-063510

(51) Int. Cl.
*G03B 21/16* (2006.01)
*F21V 7/20* (2006.01)
*F21V 29/00* (2006.01)

(52) U.S. Cl.
USPC .............. 353/52; 353/61; 165/80.3; 165/182; 362/547; 362/218; 362/294; 362/345; 362/373; 348/748

(58) Field of Classification Search
USPC .............. 353/52, 61; 165/80.3, 182; 362/547, 362/218, 294, 345, 373; 348/748
See application file for complete search history.

(56) References Cited

U.S. PATENT DOCUMENTS

| 7,275,833 B2 * | 10/2007 | Saito ................................ 353/52 |
| 7,990,719 B2 | 8/2011 | Chen et al. |
| 2011/0063802 A1 * | 3/2011 | Chen et al. .................... 361/709 |

FOREIGN PATENT DOCUMENTS

| JP | 62-4190 A | 1/1987 |
| JP | 7-038025 A | 2/1995 |
| JP | 2005-303063 A | 10/2005 |
| JP | 2006-013043 A | 1/2006 |
| JP | 2007-201285 A | 8/2007 |
| JP | 2009-181098 A | 8/2009 |
| JP | 2009-186701 A | 8/2009 |
| JP | 2011-040558 A | 2/2011 |
| JP | 2011-066399 A | 3/2011 |

OTHER PUBLICATIONS

Decision to Grant dated Feb. 28, 2013 (and English translation thereof) issued in counterpart Japanese Application No. 2011-063510.

* cited by examiner

*Primary Examiner* — Tony Ko
*Assistant Examiner* — Magda Cruz
(74) *Attorney, Agent, or Firm* — Holtz, Holtz, Goodman & Chick, PC

(57) ABSTRACT

A cooling unit is provided which cools effectively a plurality of heat sources which are accommodated within small-sized electronic equipment such as a projector. There is provided a cooling unit in which a plurality of base plates 81a, 130a are disposed adjacent closely to each other, each of the base plates 81a, 130a has flat plate-shaped radiating fin 81b, 130b which is erected on rear sides thereof, each of the radiating fin 81b, 130b erected on the base plates 81a, 130a has extending portions 81d, 130d which extends over the rear sides of the base plates 81a, 130a which are adjacent to each other, and one or a plurality of heat sources are heat connected to front sides of the base plates 81a, 130a.

11 Claims, 6 Drawing Sheets

COOLING UNIT INCLUDING BASE PLATES EACH HAVING A RADIATING FINS THAT HAS AN EXTENDING PORTION TO EXTEND OVER AN ADJACENT BASE PLATE, AND PROJECTOR

CROSS-REFERENCE TO RELATED APPLICATIONS

This application is based upon and claims the benefit of priority under 35 USC 119 of Japanese Patent Application No. 2011-63510 filed on Mar. 23, 2011, the entire contents of which, including the description, claims, drawings and abstract, are incorporated herein by reference.

BACKGROUND OF THE INVENTION

1. Field of the Invention

The present invention relates to a cooling unit and a projector which includes this cooling unit.

2. Description of the Related Art

In these days, data projectors are used on many occasions as image projection units which project images including images of screens of personal computers and video images, as well as images based on image data which is stored in memory cards on to a screen. In these projectors, light emitted from a light source is collected on to a micromirror display device called a digital micromirror device (DMD) or a liquid crystal plate for projection of color images on to a screen.

Conventionally, the mainstream of these projectors has been those which use a high-intensity discharge lamp as a light source. However, in recent years, there have been made many developments on data projectors which use, as a light source, semiconductor light emitting elements such as LEDs, laser diodes and organic EL devices or luminescent material and like this. However, semiconductor light emitting elements which are adopted as light sources are highly heat dependent, and it is a known characteristic of a semiconductor light emitting element that when the temperature thereof is increased, the efficiency of transformation from electric power to light is deteriorated.

Then, a cooling construction is generally adopted in which the heat of a semiconductor light emitting element is transmitted to a heat sink, and cooling air is sent to radiator fins which are provided in parallel on a base plate portion of the heat sink so that the semiconductor light emitting element is cooled. In addition, other various proposals to cool such a semiconductor light emitting elements with good efficiency have been made (for example, Japanese Unexamined Patent Publication No. 2007-201285 (JP-A-2007-201285).

A projector disclosed in JP-A-2007-201285 includes a light source unit in which two semiconductor light emitting elements are heat connected individually to two heat sinks. In this light source unit, the two heat sinks are disposed so that heat radiating directions therefrom become opposite to each other, whereby the cooling efficiency can be increased by preventing the interference of heat dissipation. In this construction, however, the heat sinks are cooled individually, and therefore, it has been difficult to reduce the overall size of the projector.

BRIEF SUMMARY OF THE INVENTION

The invention has been made in view of the problem inherent in the related art, and an object of the invention is to provide a cooling unit which can cool effectively a plurality of heat sources accommodated in small-sized electronic equipment unit and a projector as electronic equipment which includes the cooling unit.

With a view to attaining the object, according to a first aspect of the invention, there is provided a cooling unit including a plurality of base plates which are disposed adjacent closely to each other, wherein each of the base plates includes a flat plate-shaped radiating fin which is erected on rear sides thereof, wherein the radiating fin has extending portions which extend over the rear sides of the base plates which lie adjacent to each other, and wherein a heat source is heat connected to front sides of the base plates.

According to a second aspect of the invention, there is provided a projector including a light source unit including the cooling unit and a light emitting source as the heat source, a display device, a light source side optical system which guides light from the light source unit towards the display device, a projection side optical system which projects an image emitted from the display device onto a screen, and a projector control unit which controls the light source unit and the display device.

Advantages of the invention will be set forth in the following detailed description of the invention or will be obvious in part from the description. Alternatively, the advantages may be learned through practice of the invention. The advantages of the invention may be realized or obtained by instrumentalities or combinations thereof which will be described in the following description.

BRIEF DESCRIPTION OF THE DRAWINGS

The accompanying drawings, which are incorporated in and constitute part of the specification, illustrate an embodiment of the invention and serve to explain the principles of the invention together with the general description given above and the detailed description of the embodiment given below.

DETAILED DESCRIPTION OF THE PREFERRED EMBODIMENT

Hereinafter, an embodiment of the invention will be described by reference to the accompanying drawings.

Figure 1:
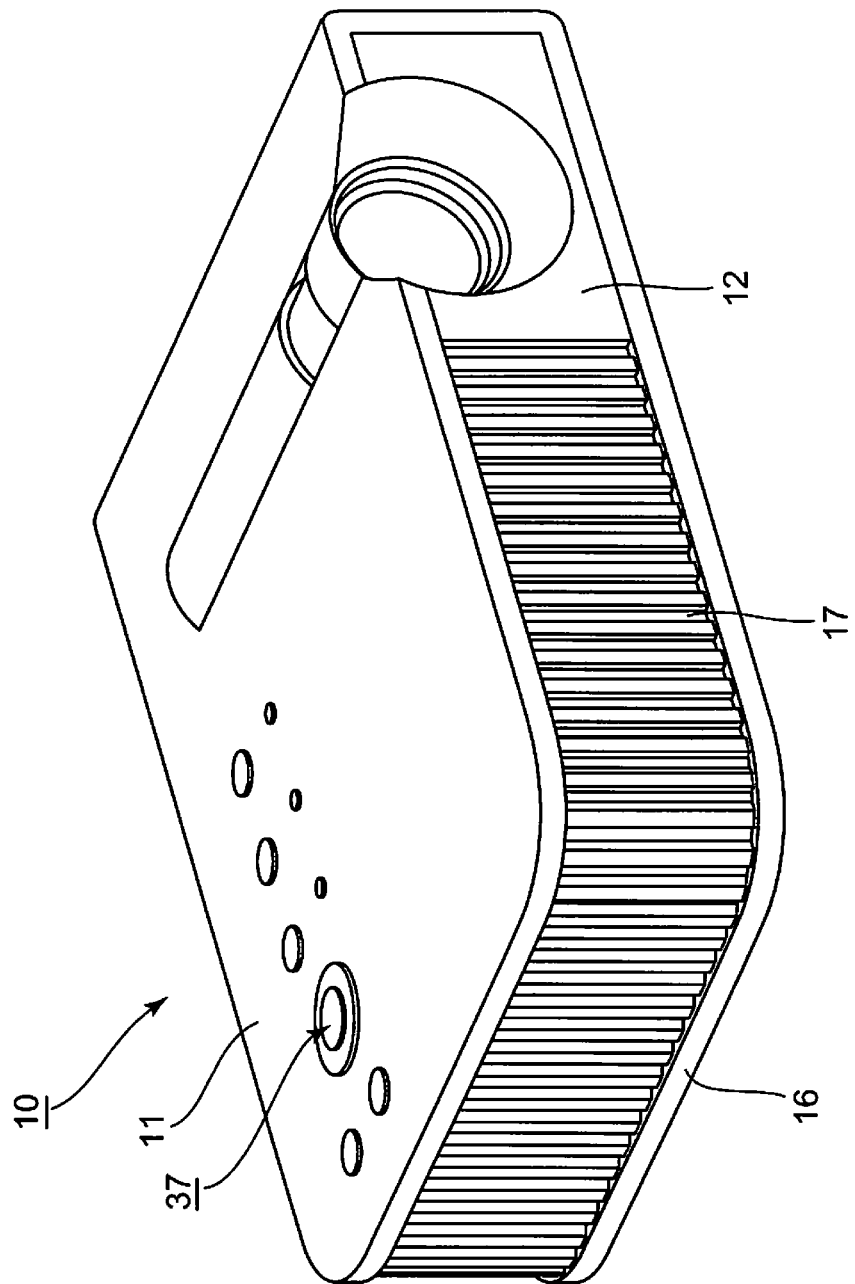
FIG. 1 is a perspective view showing an external appearance of a projector according to an embodiment of the invention.

Hereinafter, am embodiment of the invention will be described in detail by reference to the drawings. FIG. 1 is a perspective view showing an external appearance of a projector 10 according to an embodiment of the invention. In this embodiment, left and right with respect to the projector 10 denote, respectively, left and right directions with respect to a projecting direction, and front and rear denote, respectively, front and rear directions with respect to a direction towards a screen and a traveling direction of a pencil of light.

As is shown in FIG. 1, the projector 10 has a substantially rectangular parallelepiped shape and has a projecting portion which is laid to a side of a front panel 12 which is referred to as a front side panel of a projector casing, and a plurality of inside air outlet ports 17 are formed in the front panel 12. Further, although not shown, the projector 10 includes an Ir reception unit which receives a control signal from a remote controller.

In addition, a keys/indicators unit 37 is provided on an upper side panel 11 of the projector casing. Disposed on this keys/indicators unit 37 are keys and indicators which include a power supply switch key, a power indicator which informs whether the power supply is on or off, a projection switch key which switches on or off the projection by the projector, and an overheat indicator which informs of an overheat condition when a light source unit, a display device, a control circuit or the like overheats. Additionally, the upper side panel 11 extends as far as part of a left-hand side of the projector casing across an upper side thereof so as to cover them. When the projector 10 fails, the upper side panel 11 is designed to be removed from a lower side panel 16.

Further, provided on a back side or a back side panel of the projector casing are an input/output connector unit where USB terminals, an image signal input D-SUB terminal into which analog RGB image signals are inputted, an S terminal, an RCA terminal, an audio output terminal and the like are provided and various types of terminals including a power supply adaptor plug and the like. A plurality of outside air inlet ports are formed in the back side panel.

Figure 2:
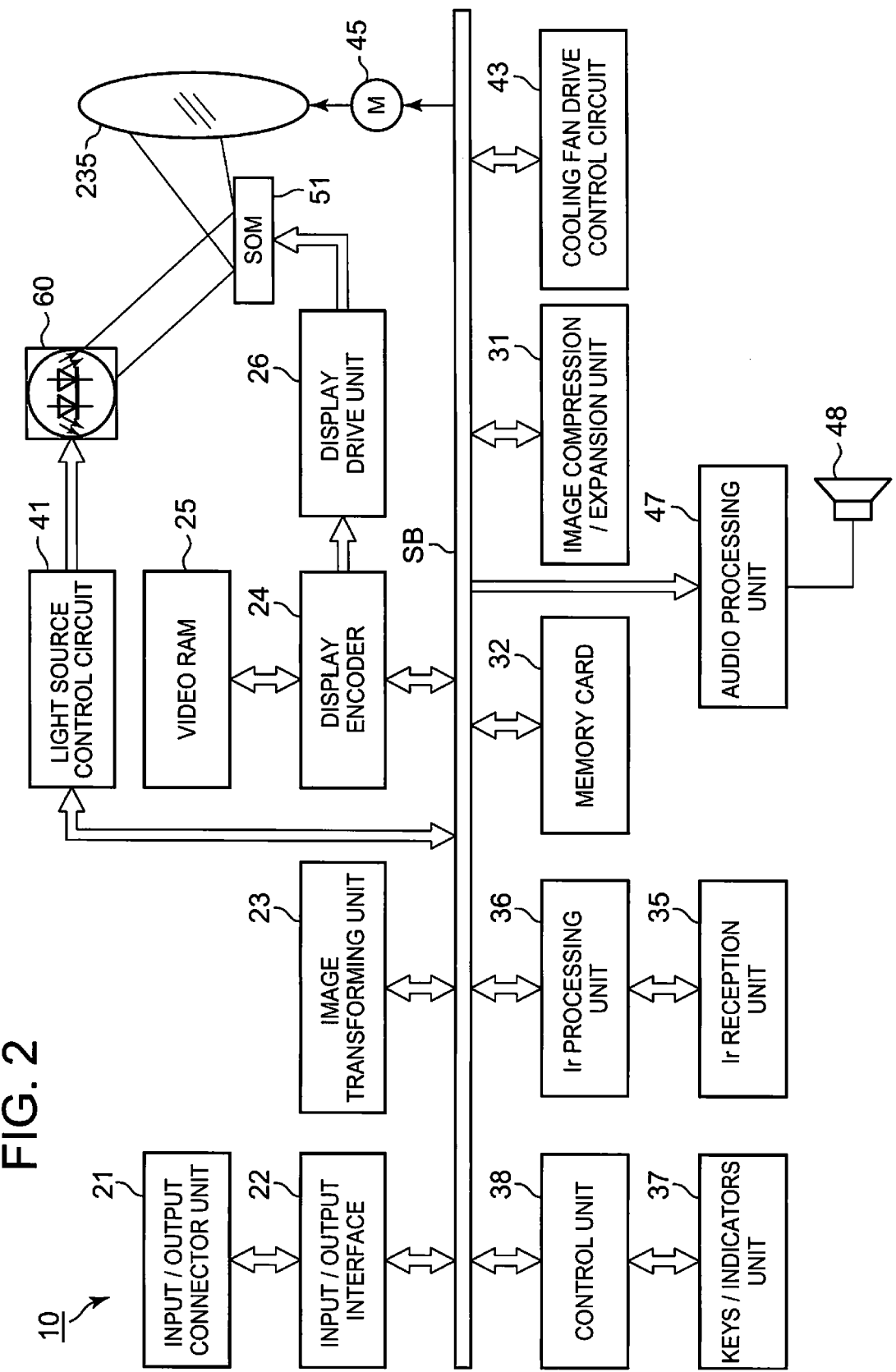
FIG. 2 is a functional block diagram of the projector according to the embodiment of the invention.

Next, a projector control unit of the projector 10 will be described by use of a functional block diagram shown in FIG. 2. The projector control unit includes a control unit 38, an input/output interface 22, an image transforming unit 23, a display encoder 24, a display drive unit 26 and the like.

The control unit 38 governs the control of respective operations of circuitries within the projector 10 and is made up of a CPU, a ROM which stores in a fixed fashion operation programs of various types of settings and a RAM which is used as a work memory.

Image signals of various standards that are inputted from the input/output connector unit 21 are sent via the input/output interface 22 and a system bus (SB) to the image transforming unit 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display drive unit 26.

The display drive unit 26 functions as a display device control unit and drives a display device 51 which is a spatial optical modulator (SOM) at an appropriate frame rate in response to the image signal outputted from the display encoder 24. In this projector 10, a pencil of light which is emitted from a light source unit 60 is shone onto the display device 51 via a light source side optical system, which will be described later, to thereby form an optical image based on reflected light reflected by the display device 51 which is driven by the display drive unit 26. The image so formed is then projected onto a screen, not shown, for display thereon via a projection side optical system, which will be described later. In addition, a movable lens group 235 of the projection side optical system is driven by a lens motor 45 for zooming or focusing.

An image compression/expansion unit 31 performs a recording operation in which a luminance signal and a color difference signal of an image signal are data compressed through ADCT and Huffman coding operations and the compressed data is sequentially written on a memory card 32 which is configured as a detachable recording medium.

Further, when in a reproducing mode, the image compression/expansion unit 31 reads out image data recorded on the memory card 32 and expands individual image data which make up a series of dynamic images frame by frame. Then, the image data is outputted to the display encoder 24 via the image transforming unit 23 so as to enable the display of dynamic images based on the image data stored on the memory card 32.

Operation signals generated at the keys/indicators unit 37 which is made up of the main keys, indicators and the like and which is provided on the upper side panel 11 of the projector casing are sent out directly to the control unit 38. Key operation signals from the remote controller are received by the Ir reception unit 35, and a code signal demodulated at an Ir processing unit 36 is outputted to the control unit 38.

In addition, an audio processing unit 47 is connected to the control unit 38 via the system bus (SB). This audio processing unit 47 includes a circuitry for a sound source such as a PCM sound source. When in a projection mode and a reproducing mode, the audio processing unit 47 converts audio data into analog signals and drives a speaker 48 to output loudly sound or voice based on the audio data.

The control unit 38 controls a light source control circuit 41 which is configured as a light source control unit. This light source control circuit 41 controls individually the emission of light of a red light source device, a green light source device and a blue light source device of the light source unit 60 so that light of a predetermined wavelength band which is required when an image is generated is emitted from the light source unit 60.

Further, the control unit 38 causes a cooling fan drive control circuit 43 to detect temperatures through a plurality of temperature sensors which are provided in the light source unit 60 so as to control the rotating speed of a cooling fan based on the results of the temperature detection. Additionally, the control unit 38 also causes the cooling fan drive control circuit 43 to make the cooling fan continue to rotate even after the power supply of a projector main body is switched off by use of a timer or the like or to make the power supply to the projector main body be cut off depending upon the results of the temperature detection by the temperature sensors.

Figure 3:
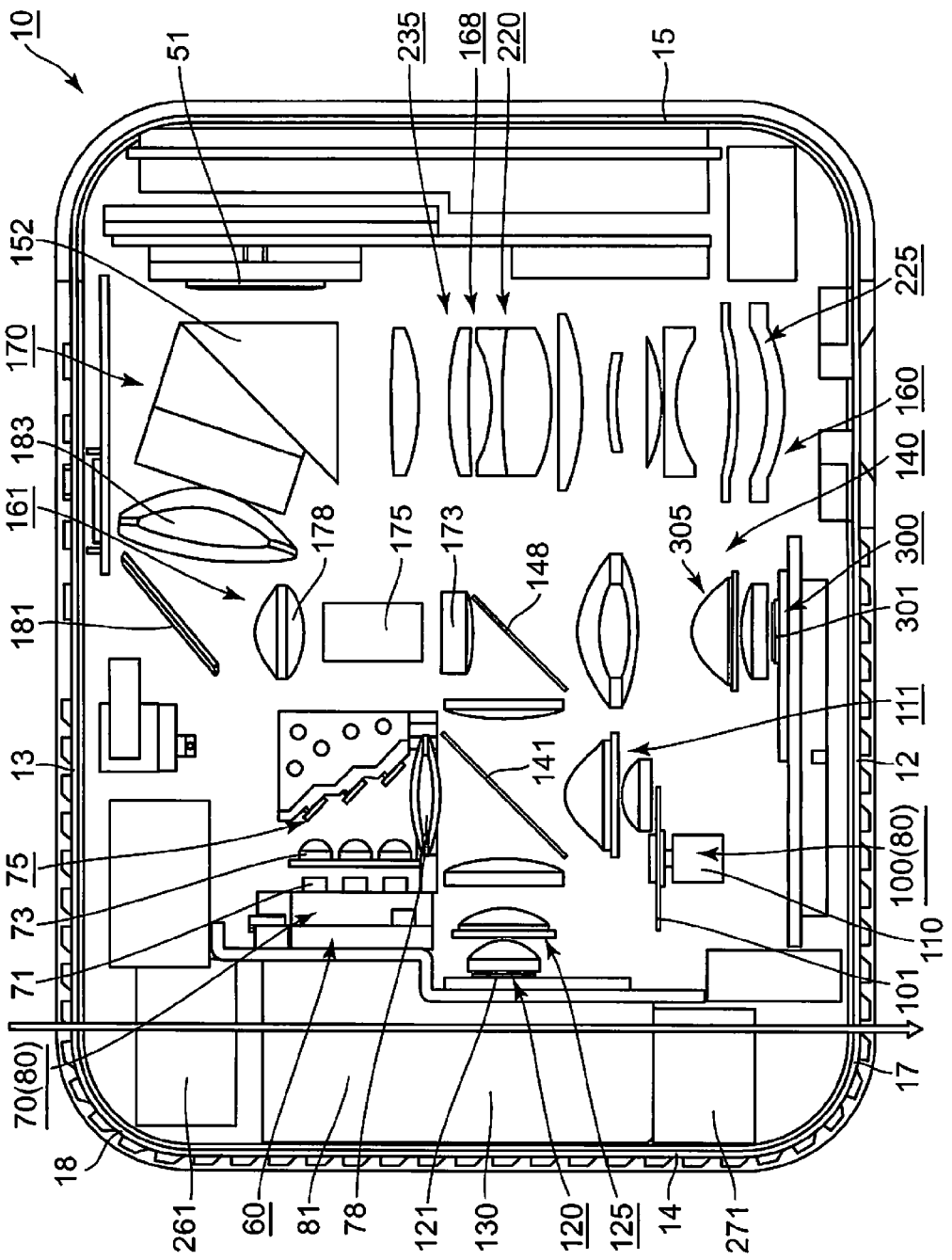
FIG. 3 is an exemplary plan view showing an internal construction of the projector according to the embodiment of the invention.

Next, an internal construction of the projector 10 will be described. FIG. 3 is an exemplary plan view showing an internal construction of the projector 10.

The projector 10 includes a control circuit board in an interior thereof. This control circuit board includes a power supply circuit block and a light source control block.

As is shown in FIG. 3, the projector 10 includes the light source unit 60 which is provided at a substantially central portion of the projector casing. Further, the projector 10 includes an optical system unit 160 between the light source 60 and the left-hand side panel 15.

The light source unit 60 includes an excitation light shining device 70, a green light source device 80 which is made up of a luminescent light emitting device 100, a blue light source device 300, a red light source device 120 and a light guiding optical system 140. The excitation light shining device 70 is disposed at a substantially transversely central portion of the projector casing and in proximity to the back side panel 13. The luminescent light emitting device 100 is disposed on the axis of a pencil of light emitted from the excitation light shining device 70 and in proximity to the front side panel 12.

The blue light source device 300 is disposed in proximity to the front side panel 12 so as to be parallel to a pencil of light which is emitted from the luminescent light emitting device 100. The red light source device 120 is disposed between the excitation light shining device 70 and the luminescent light emitting device 100. The light guiding optical system 140 turns the directions of axes of light emitted from the luminescent light emitting device 100, light emitted from the red light source device 120 and light emitted from the blue light source device 300 so that the axes of the light of different colors emitted from the luminescent light emitting device 100 and the light source devices 120, 300 are collected to the same optical axis so as to be guided to an entrance port of a light tunnel 175 which is a predetermined plane.

The excitation light shining device 70 of the green light source device 80 includes excitation light sources 71, a group of reflection mirrors 75, a collective lens 78, and heat sinks 81, 130, which will be described later, which are disposed between the excitation light sources 71 and the right-hand side panel 14. The excitation light sources 71 are made up of semiconductor light emitting elements which are disposed so that their optical axes are parallel to the back side panel 13. The group of reflection mirrors 75 turns the direction of the axis of light emitted from the corresponding excitation light sources 71 by 90 degrees towards the front side panel 12. The collective lens 78 collects the light emitted from the excitation light sources 71 and reflected by the group of refection mirrors 75.

The excitation light sources 71 are arranged into a matrix of two rows and three columns of a total of six blue laser diodes which are semiconductor light emitting elements. Collimator lenses 73 are disposed individually on optical axes of the blue laser diodes. The collimator lenses 73 are collective lenses which transform light emitted from the blue laser diodes into parallel light. In addition, the group of reflection mirrors 75 is made up of a plurality of reflection mirrors which are arranged as in stairs. The reflection mirrors 75 reduce sectional areas of pencils of light which are emitted from the corresponding excitation light sources 71 in one direction for emission to the collective lens 78.

An air intake fan 261 is disposed between the heat sink 81 and the back side panel 13. This air intake fan 261 is a blower fan which blows outside air towards the heat sink 81 as a cooling medium, and the excitation light sources 71 are cooled by the air intake fan 261 and the heat sink 81.

The luminescent light emitting device 100 of the green light source device 80 includes a luminescent wheel 101, a wheel motor 110 which rotationally drives the luminescent wheel 101 and a group of collective lenses 111 which collects pencils of luminescent light emitted from the luminescent wheel 101 towards the back side panel 13. The luminescent wheel 101 is disposed so as to be parallel to the front side panel 12, that is, so as to be at right angles to light emitted from the excitation light shining device 70 along an optical axis of the collective lens 78.

The luminescent wheel 101 is a circular disk-shaped metal base. An annular luminescent light emitting area is formed on the luminescent wheel 101 as a depressed portion. This annular luminescent light emitting area receives light emitted from the excitation light sources 71 as excitation light and emits luminescent light of green wavelength band. Thus, the luminescent wheel 101 functions as a luminescent member which receives excitation light to emit luminescent light. In addition, a surface of aside of the luminescent wheel 101 which faces the excitation light sources 71 including the luminescent light emitting area is mirror finished through silver deposition or the like, whereby a reflection plane which reflects light is formed on the surface. A layer of a green luminescent material is laid on this reflection plane.

Light emitted from the excitation light shining device 70 and shone on to the green luminescent material layer on the luminescent wheel 101 excites the green luminescent material in the green luminescent material layer. Pencils of luminescent light are emitted in every direction from the green luminescent material. Then, the pencils of luminescent light so emitted are directed directly towards the excitation light sources 71 or are reflected on the reflection plane of the luminescent wheel 101 so as to be eventually directed towards the excitation light sources 71.

In addition, excitation light which is shone on to the metal base without being absorbed by the luminescent material in the luminescent material layer is reflected by the reflection plane to enter the luminescent material layer again, whereby the luminescent material is excited. Thus, by making the surface of the depressed portion on the luminescent wheel 101 into the reflection plane, the efficiency of utilization of excitation light emitted from the excitation light sources 71 which are green light sources can be enhanced, so that brighter luminescent light can be emitted from the luminescent wheel 101.

In excitation light which is reflected on the reflection plane of the luminescent wheel 101 towards the luminescent material layer, excitation light which is emitted towards the excitation light sources 71 without being absorbed by the luminescent material passes through a first dichroic mirror 141, and luminescent light is reflected by the first dichroic mirror 141. Therefore, excitation light is emitted to the outside of the projector 10 in no case. Then, a heat sink and an exhaust fan are disposed between the wheel motor 110 and the front side panel 12, and the luminescent wheel 101 is cooled by these heat sink and exhaust fan.

The red light source device 120 includes a red light source 121 and a group of collective lenses 125 which collects light emitted from the red light source 121. This red light source 121 is disposed so that an optical axis thereof is parallel to the optical axes of the excitation light sources 71. The red light source device 120 is disposed so that the optical axis thereof intersects the axis of light emitted from the excitation light shining device 70 and the axis of luminescent light of green wavelength band which is emitted from the luminescent wheel 101.

The red light source 121 is a red light emitting diode which is a semiconductor light emitting element which emits light of red wavelength band. Further, the red light source device 120 includes a heat sink 130, which will be described later, which is disposed on a side of the red light source 121 which faces the right-hand side panel 14. In addition, an exhaust fan 271 is disposed between the heat sink 130 and the front side panel 12. This exhaust fan 271 functions as a suction fan which sucks the cooling medium which has been sent by the blower fan as described above and warmed by the heat sinks 81, 130 to discharge it to the outside of the projector 10. The red light source 121 is cooled by the exhaust fan 271.

A base plate portion and fins of the heat sink 130 will be described later together with the heat sink 81 that has been described above.

The blue light source 300 includes a blue light source 301 and a group of collective lenses 305 which collects light emitted from the blue light source 301. The blue light source 301 is disposed so that an optical axis thereof is parallel to the axis of light emitted from the luminescent light emitting device 100. The blue light source device 300 is disposed so that the axis of light emitted therefrom intersects the axis of light emitted from the red light source device 120. The blue light source 301 is a blue light emitting diode which is a semiconductor light emitting element which emits light of blue wavelength band. Further, the blue light source device 300 includes a heat sink which is disposed on a side of the blue light source 301 which faces the front side panel 12. An exhaust fan is disposed between the heat sink and the front side panel 12, and the blue light source 301 is cooled by this exhaust fan.

The light guiding optical system 140 includes collective lenses which collect pencils of light of red, green and blue wavelength bands and dichroic mirrors which turn the directions of axes of the pencils of light of red, green and blue wavelength bands so as to direct them to the same optical axis.

Specifically speaking, the first dichroic mirror 141 is disposed in a position where the axes of light of blue wavelength band emitted from the excitation light shining device 70 and light of green wavelength band emitted from the luminescent wheel 101 intersect the axis of light of red wavelength band emitted from the red light source device 120. This first dichroic mirror 141 transmits light of blue and red wavelength bands and reflects light of green wavelength band to turn the direction of the axis of the green light by 90 degrees towards the left-hand side panel 15.

In addition, a second dichroic mirror 148 is disposed in a position where the axis of light of blue wavelength band emitted from the blue light source device 300 intersects the axis of light of red wavelength band emitted from the red light source device 120. This second dichroic mirror 148 transmits light of blue wavelength band and reflects light of green and red wavelength bands to turn the direction of the axis of the green and red light by 90 degrees towards the back side panel 13. A collective lens is disposed between the first dichroic mirror 141 and the second dichroic mirror 148. Further, a collective lens 173 is disposed in proximity to the light tunnel 175. This collective lens 173 collects light source light to the entrance port of the light tunnel 175.

The light source system unit 160 is configured into a substantially U-shape by three blocks such as an illumination side block 161 which is positioned to a left-hand side of the excitation light shining device 70, an image generating block which is positioned in proximity to a position where the back side panel 13 intersects the left-hand side panel 15, and a projection side block 168 which is disposed between the light guiding optical system 140 and the left-hand side panel 15.

The illumination side block 161 includes part of a light source side optical system 170 which guides light source light emitted from the light source unit 60 to the display device 51 that is possessed by the image generating block. Included as the light source side optical system 170 that the illumination side block 161 possesses are the light tunnel 175 which transforms a pencil of light emitted from the light source unit 60 into a pencil of light in which the intensity thereof is uniformly distributed, a collective lens 178 which collects light emitted from the light tunnel 175, and a light direction turning mirror 181 which turns the direction of the axis of a pencil of light emitted from the light tunnel 175 towards the image generating block.

The image generating block has, as the light source side optical system 170, a collective lens 183 which collects the light source light which is reflected on the light direction turning mirror 181 to the display device 51 and a prism 152 which shines "on" light on to a projection side optical system 220. The "on" light results from the pencil of light that has passed through the collective lens 183 to be shone on to the display device 51 and which is reflected on the display device 51. The image generating block includes further a DMD which is the display device 51. A heat sink for cooling the display device 51 and the like are disposed between the display device 51 and the left-hand side panel 15. Thus, the display device 51 is cooled by this heat sink and the like.

The projection side block 168 has a group of lenses of the projection side optical system 220 which projects the "on" light which is reflected on the display device 51 on to the screen. This projection side optical system 220 includes a group of fixed lenses 225 which is incorporated in a fixed lens barrel and a group of movable lenses 235 which is incorporated in a movable lens barrel. These groups of lenses are made into a variable focus lens having a zooming function, and the group of movable lenses 235 is moved by a lens motor for zooming and focusing.

Next, cooling units will be described by use of the drawings which cool the excitation light shining device 70 and the red light source device 120 which are heat sources provided side by side within the projector 10.

Figure 4:
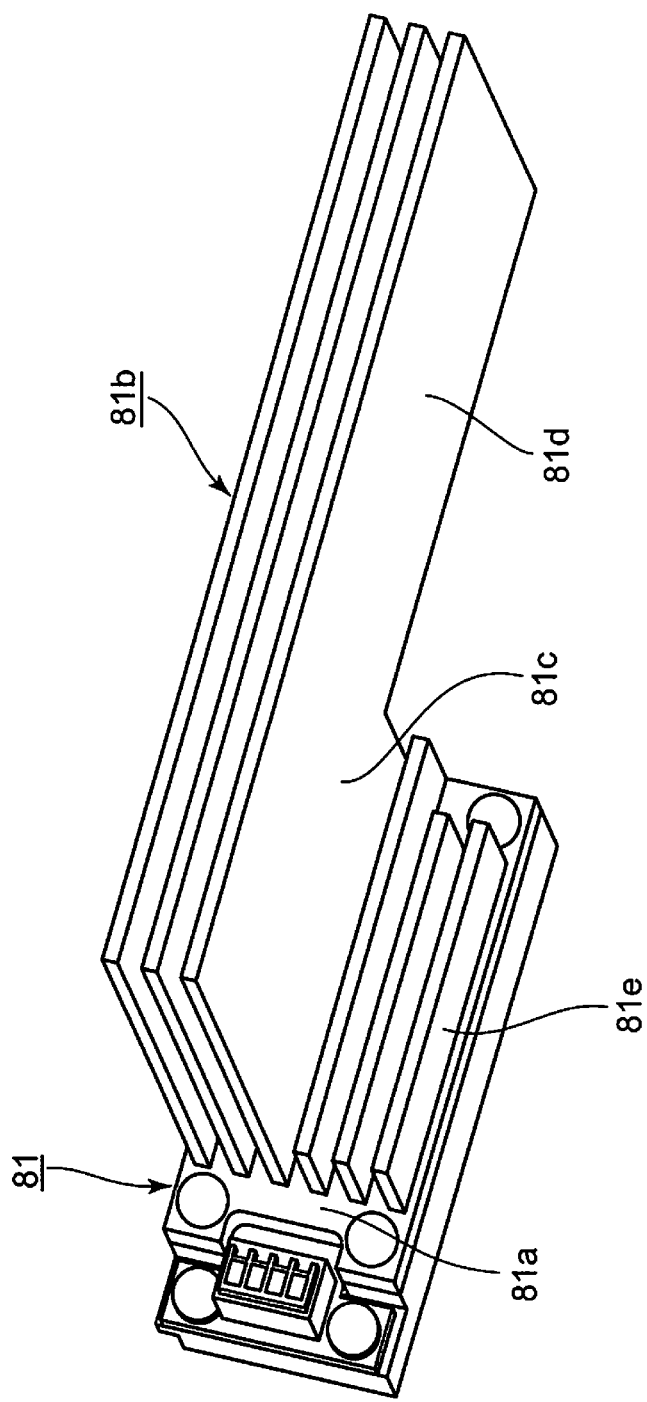
FIG. 4 is a perspective view of a first heat sink which is a cooling unit according to the embodiment of the invention.
Figure 5:
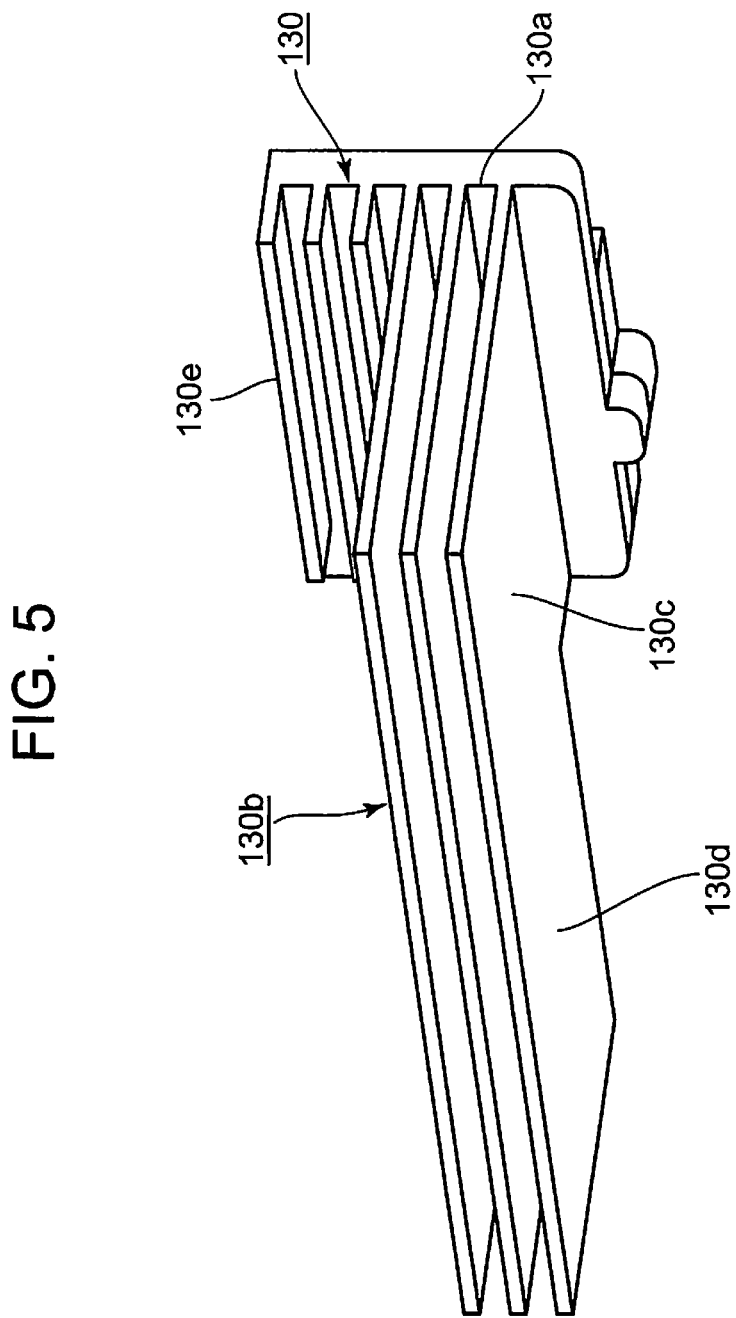
FIG. 5 is a perspective view of a second heat sink which is a cooling unit according to the embodiment of the invention.
Figure 6:
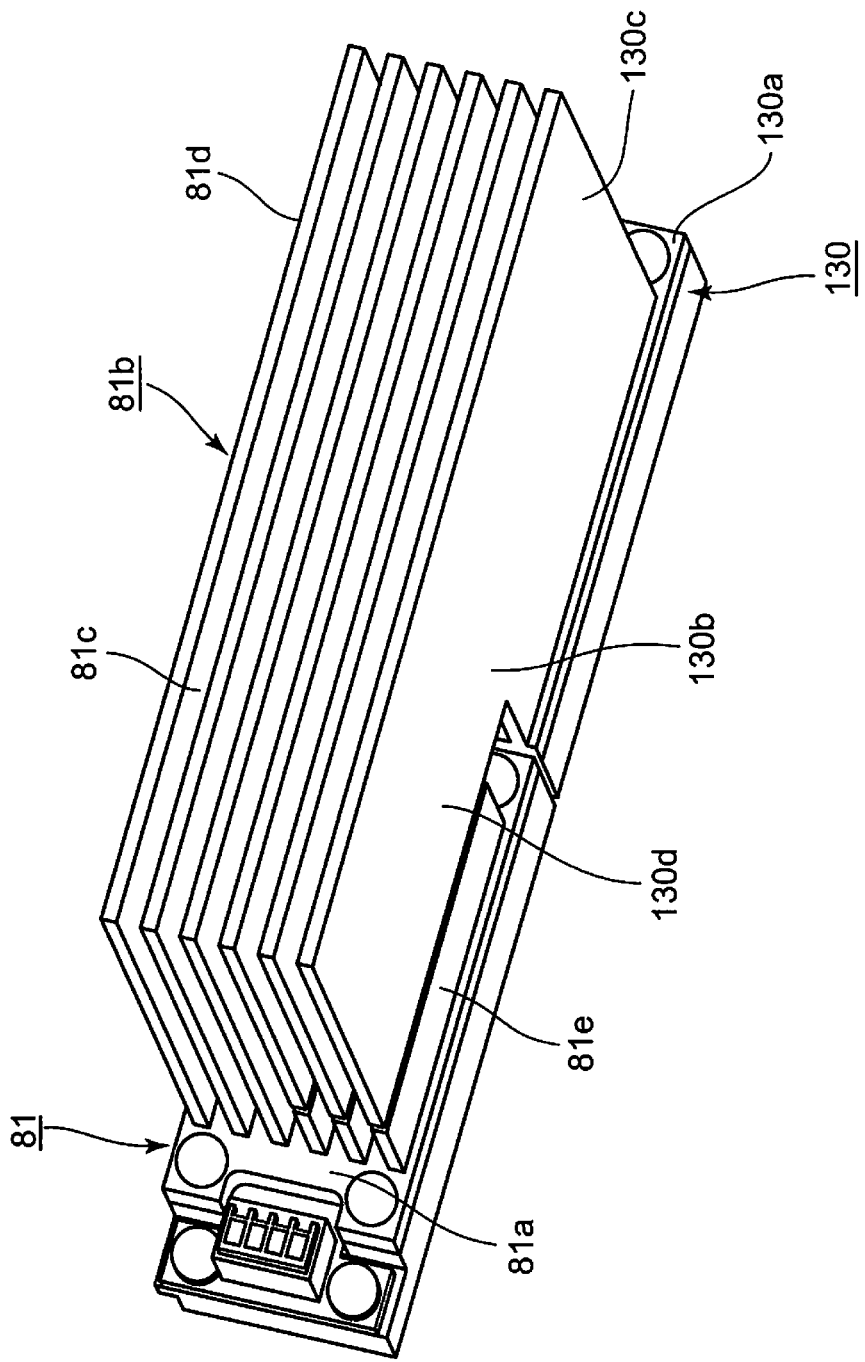
FIG. 6 is a perspective view of the cooling unit according to the embodiment of the invention.

FIG. 4 is a perspective view of the first heat sink 81 as a cooling unit which is positioned behind the excitation light sources 71 which constitute a heat source according to the embodiment. FIG. 5 is a perspective view of the second heat sink 130 as a cooling unit which is positioned behind the red light source 121 which constitutes a heat source according to the embodiment. FIG. 6 is a perspective view of a cooling unit into which the first heat sink 81 and the second heat sink 130 are engaged in a superposed fashion.

The first heat sink 81 which functions as a cooling unit for radiating heat from the excitation light sources 71 is a metallic member. As shown in FIG. 4, the first heat sink 81 has a base plate 81a which is a base plate portion which is brought into planar contact with the excitation light sources 71 behind the excitation light sources 71 so as to be heat connected to the semiconductor light emitting elements which constitute a heat source, three flat plate-shaped radiating fins 81b which are erected in parallel from a rear side of the base plate 81a, and three auxiliary radiating fins 81e which are disposed below the flat plate-shaped radiating fins 81b.

The three radiating fins 81b are formed integrally with the base plate 81a or are formed as separate members which are fixed to the base plate 81a in a fitting fashion. Each radiating fin 81b has a main body portion 81c which extends rearwards from a radiating fin base portion which is joined to the base plate 81a in the same width as that of the radiating fin base portion and an extending portion 81d which extends in a transverse direction from the main body portion 81c. A rear edge of the main body portion 81c and a rear edge of the extending portion 81d are formed rectilinearly so as to be parallel to the base plate 81a. Each radiating fin 81b is formed into an L-shape by the main body portion 81c and the extending portion 81d.

In addition, as shown in FIG. 4, the three auxiliary radiating fins 81e are formed integrally with the base plate 81a or are formed as separate members which are fixed to the base plate 81a in a fitting fashion below the radiating fins 81b. Each auxiliary radiating fin 81e extends rearwards from an auxiliary radiating fin base portion in the same width as that of the auxiliary radiating fin base portion over a length which is shorter than a length of the main body portion 81c of the radiating fin 81b.

As shown in FIG. 5, similar to the first heat sink 81, the second heat sink 130 which functions as a cooling unit for radiating heat from the red light source 121 is a metallic member. The second heat sink 130 has a base plate 130a which is a base plate portion which is brought into planar contact with the red light source 121 which is provided parallel to the excitation light sources 71 behind the red light source 121 so as to be heat connected to the red light source 121, three flat plate-shaped radiating fins 130b which are erected in parallel from a rear side of the base plate 130a, and three auxiliary radiating fins 130e which are disposed above the flat plate-shaped radiating fins 130b.

The three radiating fins 130b, similar to the first heat sink 81, are formed integrally with the base plate 130a or are formed as separate members which are fixed to the base plate 130a in a fitting fashion. Each radiating fin 130b has a main body portion 130c which extends rearwards from a radiating fin base portion which is joined to the base plate 130a in the same width as that of the radiating fin base portion and an extending portion 130d which extends in a transverse direction from the main body portion 130c. A rear edge of the main body portion 130c and a rear edge of the extending portion 130d are formed rectilinearly so as to be parallel to the base plate 130a. Each radiating fin 130b is formed into an L-shape by the main body portion 130c and the extending portion 130d.

In addition, as shown in FIG. 5, the three auxiliary radiating fins 130e are formed integrally with the base plate 130a or are formed as separate members which are fixed to the base plate 130a in a fitting fashion above the radiating fins 130b. Each auxiliary radiating fin 130e extends rearwards from an auxiliary radiating fin base portion in the same width as that of the auxiliary radiating fin base portion over a length which is shorter than a length of the main body portion 130c of the radiating fin 130b.

Then, the first heat sink 81 and the second heat sink 130, which are both the cooling units, are disposed, as shown in FIG. 6, so that the base plates 81a, 130a lie adjacent closely to each other and that the L-shaped radiating fins 81b, 130b overlap in parallel the auxiliary radiating fins 130e, 81e, respectively, while facing each other horizontally and transversely.

In such a state that the first heat sink 81 and the second heat sink 130 are disposed so as to lie adjacent to each other, as shown in FIG. 6, in the individual radiating fins 81b, 130b, a length from the radiating fin base portion to the rear edge becomes identical. By adopting this configuration, the rear edges of all the radiating fins 81b, 130b are formed on a plane which is parallel to the base plates 81a, 130a.

The radiating fins 81b, 130b which are erected on the base plates 81a, 130a, respectively, are erected so that lateral edges of the main body portions 81c, 130c thereof are aligned into a straight line in such a manner that the lateral edges so aligned form a plane. In addition, the radiating fins 81b, 130b are formed so that distal ends of the respective extending portions 81d, 130d thereof which extend in the transverse direction from the main body portions 81c, 130c are situated on the same plane as the plane formed by the lateral edges of the radiating fins 81b, 130b which are erected on the adjacent base plates 81a, 130a. Namely, the radiating fins 81b, 130b are formed so that the lengths of the rear edges formed by the main body portions 81c, 130c and the extending portions 81d, 130d which are situated on the rear sides of the base plates 81a, 130a become the same.

In such a state that the first heat sink 81 and the second heat sink 130 are disposed so as to be adjacent to each other, the L-shaped radiating fins 81b, 130b overlap in parallel the auxiliary radiating fins 130e, 81e, respectively, while facing each other horizontally and transversely with a predetermined interval defined therebetween. Then, an interval is defined between front edges of the extending portions 81b, 130b of the L-shaped radiating fins 81b, 130b and the auxiliary radiating fins 81e, 130e which are situated on the rear sides of the adjacent base plates 81a, 130a, whereby the transfer of heat from the auxiliary radiating fins 130e, 81e lying in proximity to the base plates 81a, 130a to the extending portions 81d, 130d of the radiating fins 81b, 130b is suppressed.

A configuration may be adopted in which the front edges of the extending portions 81d, 130d of the radiating fins 81b, 130b of the heat sinks 81, 130 are caused to lie close to rear surfaces of the base plates 130a, 81a of the heat sinks 130, 81 which lie adjacent to each other without providing the auxiliary radiating fins 81e, 130e.

As shown in FIG. 3, the cooling unit includes an air intake fan 261 disposed at one end portion in an extending direction of the flat plate-shaped radiating fins 81b, 130b which are erected on the base plates 81a, 130a of the first heat sink 81 and the second heat sink 130 which are disposed adjacent closely to each other and an exhaust fan 271 disposed at the other end portion. The air intake fan 261 functions not only as a cooling fan for drawing outside air into the projector 10 but also as a blower fan which blows the outside air so drawn towards the heat sinks 81, 130. The exhaust fan 271 functions not only as a cooling fan for drawing in air warmed up by the heat sinks 81, 130 but also as a suction fan for expelling the air so warmed up to the outside of the projector 10.

By including these cooling fans, a cooling construction can be realized in which the heat sources which are disposed along the flow of cooling medium are not discriminated from each other with respect to which one is upstream or downstream of the other. By realizing this cooling construction, fresh cooling air can be blown to the radiating fins 81b, 130b while being separated as upstream side cooling air and downstream side cooling air without using any air flow separating member such as a duct, whereby heat can be radiated equally from the heat sinks 81, 130.

The invention is not limited to the embodiment that has been described heretofore and hence can be modified or improved freely without departing from the spirit and scope of the invention. In this embodiment, while the excitation light sources 71 and the red light source 121 are described as being provided on front sides of the base plates as heat sources, the invention may be applied to more light sources as heat sources which include the luminescent light emitting device 100 and the blue light source 301. As this occurs, a configuration may be adopted in which three, four or more heat sinks are disposed so as to be closely aligned with one another. For example, heat sinks each including L-shaped radiating fins in each of which an extending portion is provided at one end of a main body portion are disposed at both ends of a heat sink including T-shaped radiating fins in each of which extending portions are provided at both ends of a main body portion so that the heat sink including the T-shaped radiating fins is positioned in the middle of the heat sinks including the L-shaped radiating fins.

In the embodiment, while the heat sinks are described as having three radiating fins, the invention is not limited thereto. For example, a configuration may be adopted in which heat sinks each have a single radiating fin.

In the embodiment, while the three radiating fins are described as being erected at equal intervals, the invention is not limited thereto. The intervals are such as to be adjusted depending on the heat generating conditions of the heat sources, and therefore, the radiating fins do not always have to be erected at equal intervals.

The cooling unit of the invention can also be applied to a cooling construction for cooling a plurality of heat sources including the display device 51 which is the DMD, a large-current semiconductor element and a power supply circuit, for example.

In the embodiment, while the invention is described as being applied to the projector 10, the invention is not limited thereto. The invention can also be applied to electronic equipment such as a personal computer, a printer and multifunction equipment in which semiconductor elements are installed which constitute heat sources.

Thus, as has been described heretofore, according to the embodiment of the invention, it is possible to provide the cooling unit which is accommodated in the small-sized electronic equipment for cooling effectively the plurality of heat sources which are disposed upstream and downstream of the flow of cooling medium and the projector 10 as such small-sized electronic equipment.

According to the embodiment of the invention, the rear edges of the respective main body portions 81*c*, 130*c* of the radiating fins 81*b*, 130*b* and the rear edges of the extending portions 81*d*, 130*d* are formed rectilinearly so as to be parallel to the base plates 81*a*, 130*a*. Therefore, in designing the layout of the interior of electronic equipment such as the projector 10, it is possible to design a compact interior layout.

According to the embodiment of the invention, the radiating fins 81*b* 130*b* which are erected on the base plates 81*a*, 130*a*, respectively, are disposed parallel to one another at predetermined intervals, and all the radiating fins 81*b*, 130*b* of the base plates 81*a*, 130*a* which are disposed adjacent to each other are disposed parallel to each other at predetermined intervals. Therefore, it is possible to effectively radiate heat from the heat sources which have certain areas.

According to the embodiment of the invention, the rear edges of all the radiating fins 81*b*, 130*b* which are erected on the base plates 81*a*, 130*a*, respectively, are situated on the plane which is parallel to the base plates 81*a*, 130*a*. Therefore, it is possible to provide the compact cooling unit.

According to the embodiment of the invention, the radiating fins 81*b*, 130*b* which are erected on the base plates 81*a*, 130*a*, respectively, are erected from the base plates 81*a*, 130*a* so that the lateral edges of the main body portions 81*c*, 130*c* form the plane. In addition, the distal ends of the extending portions 81*d*, 130*d* which extends in the transverse direction from the main body portions 81*c*, 130*c*, respectively, are situated on the same plane as that which is formed by the lateral edges of the radiating fins 81*b*, 130*b* which are elected on the adjacent base plates 81*a*, 130*a*. Therefore, the cooling medium drawn in from the atmosphere outside the projector 10 can uniformly be applied to the radiating fins 81*b*, 130*b*.

According to the embodiment of the invention, the radiating fins 81*b*, 130*b* which are erected on the base plates 81*a*, 130*a*, respectively, define spaces between the front edges of the extending portions 81*d*, 130*d* and the rear sides of the adjacent base plates 81*a*, 130*a*. In addition, the auxiliary radiating fins 81*e*, 130*e* are provided on the rear sides of the adjacent base plates 81*a*, 130*a* so as to be accommodated in the spaces defined in the way described above, and the auxiliary radiating fins 81*e*, 130*e* have a length such that they do not come into contact with the extending portions 81*d*, 130*d* of the radiating fins 81*b*, 130*b*. Therefore, the cooling medium drawn in from the atmosphere outside the projector 10 can uniformly be applied to the heat sinks 81, 130.

According to the embodiment of the invention, the cooling fans are provided in the extending directions of the flat plate-shaped radiating fins 81*b*, 130*b* on the base plates 81*a*, 130*a* which are disposed adjacent closely to each other. Therefore, the flow path of the cooling medium within the projector 10 can be made rectilinear, so that heat can be radiated effectively from the heat sinks 81, 130.

According to the embodiment of the invention, of the two cooling fans, one of the cooling fans is provided as the blower fan at the one end portion of the base plates which are disposed adjacent to each other, while the other cooling fan is provided as the suction fan at the other end portion. Therefore, air can be taken in and discharged out of the projector 10 effectively.

According to the embodiment of the invention, the one or the plurality of heat sources are the light emitting sources, and therefore, the illumination lives of the light source can be extended, whereby the reliability of the projector 10 can be enhanced.

While the invention has been described by reference to the embodiment, the embodiment has been described as the example. Therefore, there is no intention to limit the scope of the invention by the embodiment. The novel embodiment can be carried out in various forms, and various omissions, substitutions and modifications can be made to the embodiment without departing from the spirit and scope of the invention. The embodiment and variations made thereto are to be incorporated not only in the spirit and scope of the invention but also in inventions claimed under appended claims and equivalents thereof.

What is claimed is:

1. A cooling unit comprising:
   a plurality of base plates which are disposed adjacent closely to each other,
   wherein each of the base plates includes a flat plate-shaped radiating fin which is erected on a rear side thereof,
   wherein the radiating fin erected on each one of the base plates has an extending portion which extends over and overlaps the rear side of another one of the base plates that is disposed adjacent closely to said one of the base plates, and
   wherein at least one heat source is heat connected to front sides of the base plates.

2. A cooling unit as set forth in claim 1, wherein the radiating fin includes:
   a main body portion which extends rearwards from a base portion which is integrated with the base plate in a same width as that of the base portion; and
   the extending portion, which extends in a transverse direction from the main body portion, and
   wherein a rear edge of the main body portion and a rear edge of the extending portion of the radiating fin are formed rectilinearly so as to be parallel to the base plate.

3. A cooling unit as set forth in claim 1, wherein each of the base plates includes a plurality of the radiating fins which are disposed parallel to each other at predetermined intervals, and
   wherein all of the radiating fins of the plurality of base plates which are disposed adjacent to each other are disposed so as to be aligned with one another at predetermined intervals.

4. A cooling unit as set forth in claim 1, wherein each of the base plates includes a plurality of the radiating fins, and
   wherein rear edges of all of the radiating fins are situated on a plane which is parallel to the base plates.

5. A cooling unit as set forth in claim 1, wherein each of the base plates includes a plurality of the radiating fins,
   wherein the radiating fins are erected from each one of the base plates so that lateral edges of main body portions form a plane and so that distal ends of the extending portions, which extend in a transverse direction from the main body portions, are situated on the same plane as the plane formed by the lateral edges of the radiating fins which are erected on said another one of the base plates.

6. A cooling unit as set forth in claim 1, further comprising:
   an auxiliary radiating fin provided on the rear side of said another one of the base plates so as to be accommodated in a space between a front edge of the extending portion of the radiating fin erected on said one of the base plates and the rear side of said another one of the base plates, wherein the auxiliary radiating fin has a length such that the auxiliary radiating fin does not come into contact with extending portion of the radiating fin erected on said one of the base plates.

7. A cooling unit as set forth in claim 1, further comprising:

a first cooling fan provided in an extending direction of the flat plate-shaped radiating fins on the base plates.

8. A cooling unit as set forth in claim 7, further comprising:

a second cooling fan;

wherein the first cooling fan is provided as a blower fan at a first end portion of the base plates which are disposed adjacent to each other, and the second cooling fan is provided as a suction fan at a second end portion of the base plates.

9. A cooling unit as set forth in claim 1, wherein the heat source is a light emitting source.

10. A projector comprising:

a light source unit which includes the cooling unit set forth in claim 1 and a plurality of heat sources;

a display device;

a light source side optical system which guides light from the light source unit towards the display device;

a projection side optical system which projects an image emitted from the display device onto a screen; and a projector control unit which controls the light source unit and the display device.

11. A projector as set forth in claim 10, wherein the light source unit includes a light source which emits light of a red wavelength band, a light source which emits light of a blue wavelength band, and a light source which emits light of a green wavelength band, as the plurality of heat sources.

* * * * *